US005498464A

United States Patent [19]

Ikejima et al.

[11] Patent Number: 5,498,464

[45] Date of Patent: Mar. 12, 1996

[54] HEAT-SENSITIVE STENCIL SHEETS AND PROCESS

[75] Inventors: Shoichi Ikejima; Tetsu Yamanaka; Takeshi Koishihara; Kenichi Shibuya; Satoshi Chonan, all of Tokyo, Japan

[73] Assignee: Riso Kagaku Corporation, Tokyo, Japan

[21] Appl. No.: 296,128

[22] Filed: Aug. 25, 1994

Related U.S. Application Data

[63] Continuation of Ser. No. 134,177, Oct. 8, 1993, abandoned.

[30] Foreign Application Priority Data

| | | | |
|---|---|---|---|
| Oct. 9, 1992 | [JP] | Japan | 4-271647 |
| Mar. 31, 1993 | [JP] | Japan | 5-73913 |
| Apr. 12, 1993 | [JP] | Japan | 5-84597 |

[51] Int. Cl.$^6$ ..... B32B 3/00

[52] U.S. Cl. ..... 428/195; 428/364; 428/373; 428/411.7; 428/480; 428/483; 428/913; 428/914; 101/128.21

[58] Field of Search ..... 428/373, 364, 428/480, 483, 195, 364, 373, 411.1, 913, 914; 528/272, 302, 308, 308.6; 101/128, 128.21

[56] References Cited

U.S. PATENT DOCUMENTS

| | | | |
|---|---|---|---|
| 3,608,024 | 9/1971 | Yazawa | 264/103 |
| 4,959,260 | 9/1990 | Tomoyasu et al. | 428/255 |
| 5,160,564 | 11/1992 | Hasegawa et al. | 156/231 |
| 5,243,906 | 9/1993 | Okusawa | 101/128.21 |
| 5,245,932 | 9/1993 | Ujiie | 101/128.11 |
| 5,252,397 | 10/1993 | Hanzawa et al. | 428/373 |

FOREIGN PATENT DOCUMENTS

| | | |
|---|---|---|
| 439960 | 8/1991 | European Pat. Off. . |
| 62-184888 | 8/1987 | Japan . |

*Primary Examiner*—Patrick J. Ryan
*Assistant Examiner*—William A. Krynski
*Attorney, Agent, or Firm*—Fay, Sharpe, Beall, Fagan, Minnich & McKee

[57] ABSTRACT

A heat-sensitive stencil sheet consisting of a porous substrate and a thermoplastic film adhered to the substrate is provided without no use of an adhesive. The porous substrate comprises a screen cloth wholly or partially consisting of conjugate fibers (a sheath-core type or a side-by-side type) one exposed component of which has an affinity with the thermoplastic resin film and having a melting point lower than that of the other component of the conjugate fiber and lower than that of the thermoplastic resin, and the screen cloth is adhered to the thermoplastic resin film through the exposed component. The heat-sensitive stencil sheet can be produced by superposing the thermoplastic resin film on the substrate and heating under pressure the superposed film and substrate at the softening point or higher of the above exposed component of the conjugate fiber and at a temperature lower than the melting point of the other component of the conjugate fiber and lower than the melting point of the thermoplastic resin.

6 Claims, No Drawings

HEAT-SENSITIVE STENCIL SHEETS AND PROCESS

This application is a continuation of U.S. application Ser. No. 08/134,177, filed Oct. 8, 1993, now abandoned.

BACKGROUND OF THE INVENTION

1. Field of the Invention

The present invention relates to a heat-sensitive stencil sheet and a process for producing it. Specifically, it relates to a heat-sensitive stencil sheet, which is excellent in a heat-sensitive and perforating property by a thermal head, a xenon process system, a flush valve system and others, and a process for producing the heat-sensitive stencil sheet.

2. Description of the Prior Art

In a prior art, a heat-sensitive stencil sheet is composed of a thermoplastic resin film such as a polyester film and a porous substrate adhered on one surface of the film with an adhesive. The heat-sensitive stencil sheet is processed by bringing a thermal head in contact with the thermoplastic resin film of the sheet, thermally melting the film by the resulting heat and forming the corresponding opening portion to the image portion of a manuscript on the sheet.

In such a stencil paper, however, an adhesive layer is formed between the thermoplastic resin film and the porous substrate in order to laminate them on each other. Therefore, there are the problems in that the film perforating property due to the heat from a thermal head is easily damaged and the adhesive layer is dissolved with the organic solvents contained in an ink at the time of printing, resulting in lowering the resistance to printing of the stencil paper. In the case of producing the stencil sheet described above, there are also other problems in that when the coated quantity of the adhesive is too much, the perforated portions in the porous substrate are buried by adhesive layers, the perforating sensitivity of the film is reduced, the ability for processing is lowered and the permeabilities of inks are decreased, and on the other hand, when the coated quantity of the adhesive is too small, the adhesion strength is low, the resistance to printing becomes bad and it is difficult to control the production processes.

SUMMARY OF THE INVENTION

It is a main object of this invention to solve the above-mentioned problems in the prior art and provide a heat-sensitive stencil sheet excellent in the film perforating property and the resistance to printing by a thermal head, a xenon process system, a flush valve system and others, and further a process for producing the heat-sensitive stencil sheet which production processes can be easily controlled.

The first aspect of the present invention resides in a heat-sensitive stencil sheet consisting of a porous substrate and a thermoplastic film adhered to the substrate, wherein the porous substrate comprises a screen cloth wholly or partially consisting of conjugate fibers one exposed component of which has an affinity with the thermoplastic resin film, and the screen cloth is adhered to the thermoplastic resin film through the exposed component of the conjugate fiber.

The above exposed component of the conjugate fiber may be preferably composed of a resin having a melting point lower than that of the other component resin and lower than that of the thermoplastic resin film.

The second aspect of the present invention resides in a process for producing a heat-sensitive stencil sheet, which process comprises the following steps;

providing a thermoplastic resin film and a screen cloth wholly or partially consisting of a conjugate fiber having at least one exposed component composing of a resin having an affinity with the thermoplastic resin and having a melting point lower than that of the other component of the conjugate fiber and lower than that of the thermoplastic resin;

superposing the thermoplastic resin film on the substrate; and heating under pressure the superposed film and substrate at the softening point or higher of the above exposed component of the conjugate fiber and at a temperature lower than the melting point of the other component of the conjugate fiber and lower than the melting point of the thermoplastic resin.

The above exposed component of the conjugate fiber may be preferably composed of a copolymerized polyester resin having a lower melting point, the other component of the conjugate fiber may be preferably composed of a polyester resin having a higher melting point, and the thermoplastic resin is composed of the polyester resin.

The above mentioned conjugate fiber may be of a sheath-core type or a side-by-side type and can be obtained by melt-spinning two kind of thermoplastic resins through a spinning device for conjugate spinning, and drawing the resulting fiber, if necessary.

In order to adhere the thermoplastic film at a broader contact area on the substrate, it is preferable to use a sheath-core type conjugate fiber.

According to the heat-sensitive stencil sheets of the present invention, since the screen cloth and the thermoplastic resin film are adhered to each other by lines or points contacts through the component of the conjugate fiber, having an affinity with the thermoplastic resin, the following excellent effects can be obtained.

(1) Since there is no adhesive layer between the film and the substrate differently from the prior art, the perforation of the stencil sheet by the thermal head is not damaged by the adhesive layer. Further, since the smoothing property on the film surface of the superposed sheet can be enhanced, the contact of the sheet to the thermal head is improved at the time of perforation processing. Thereby, the thermal transfer efficiency is improved and both the perforating property and the process sensitivity can be largely improved.

(2) Since the sheet surface is smooth due to no adhesive layer, the thickness of the stencil sheet can be made thiner and the film surface of the stencil sheet becomes more smooth and uniform. Thus, the printed letters after printing is uniformed by the uniformity of the pressure applied on the unit area of the sheet surface at printing time so that the more accurate images of manuscripts can be obtained.

(3) Since the sheet strength is not influenced by the components in the ink, the resistance to printing can be improved.

(4) Since the intersections between the wefts and warps of the screen cloth are rigidly fixed by the softening or fusion of the lower melting point component and the contact area between the film and the screen is enlarged, the rigidity of the sheet is improved and the generation of wrinkling at the time of carrying it can be prevented.

(5) Since the coating process of the adhesive layer is not needed, the control of the production processes becomes easy.

As a thermoplastic resin film used in the present invention, it is possible to use any films applicable to normal heat-sensitive stencil sheets such as those of polyester, polyvinylidene chloride, polypropylene and the like. Their thicknesses are preferably in the range of 0.5–8 μm from the standpoints of thermal perforating property, film strength and others.

A screen cloth used in the present invention comprises a cloth or web (non-woven cloth) having wholly or partially a conjugate fiber of a sheath-core or side-by-side type structure. The sheath component in the sheath-core structure or the one exposed side component in the side-by-side type structure, is composed of a resin having an affinity with the thermoplastic resin film. In the present invention, the component having an affinity with the thermoplastic resin film means such a component as has an ample adhesion force with the thermoplastic resin film by heating under pressure the superposed film and screen cloth or by subjecting them to alternative means such as light irradiation, etc., and would not be easily peeled off. Such a component may be preferably of the same resin as that of the thermoplastic resin film.

In order to adhere a screen cloth to the thermoplastic resin film by heating, the melting point of the exposed component, that is the sheath component in the sheath-core structure or one side-component in the side-by-side structure is lower than that of the other component, that is the core component or the other side component. Further, the melting point of the exposed component should be lower than that of the thermoplastic resin film. The above exposed component having such a lower melting point is referred to a lower melting point component thereafter.

For example, in the case of using a polyethylene terephthalate film as a thermoplastic resin film, a copolymerized polyester having a lower melting point than that of the polyethylene terephthalate film is used as the above-mentioned lower melting point component. The copolymerized polyester can be obtained by adding other monomer or reaction components such as polyethylene glycol at the time of preparing polyethylene terephthalate. As the other monomer or reaction components, a dicarboxylic acid such as isophthalic acid, adipic acid or dimer acid, a lower molecular weight glycol such as ethylene glycol or butanediol, and polyalkylene glycols such as polyethylene glycol or polytetramethylene glycol are exemplified.

Regarding the applied ratio of both components in the sheath-core type and side-by-side type conjugate fiber, it is preferable to use such an amount that the adhesion force is sufficient when the lower melting point component of the conjugate fiber is adhered to the thermoplastic film and that the meshes in the screen cloth are not damaged by deformation or thermal fusion of the conjugate fiber. Thus, the sectional area ratio of the sheath component and the core component (sheath component/core component) is preferably in the range of 5/95–70/30, more preferably in the range of 10/90–50/50. On the other hand, the sectional area ratio of the lower melting point component of the side-by-side type conjugate fiber (lower melting point component/higher melting point component) is preferably in the range of 5/95–70/30, more preferably in the range of 10/90–50/50. The sectional form of the conjugate fiber may be circular or modified sectional surface. A sectional form of the core in the sheath-core structure and a number of the core component are not limited to the above-mentioned one, and it is possible to select and decide them according to a use object.

As for the core component of the sheath-core type conjugate fiber and the other side component of the side-by-side type conjugate fiber (which will be referred to a high melting point component thereafter), there is no particular limitation if it is not molten or deformed by heating under pressure when the screen cloth and the thermoplastic resin film are adhered on each other. However, it is preferable to use a resin component having a lower affinity with the ink. For example, it is preferable to use polyester, particularly polyethylene terephthalate from the standpoint of melting point and availability.

The conjugate fiber can be obtained by a normal melt-spinning process using a known nozzle for conjugate spinning and the screen cloth used in the present invention can be obtained by weaving into a plain cloth and the like by means of a known weaving method using wholly or partially this conjugate fiber (filament). The screen cloth may be constituted only by the conjugate fiber, but the conjugate fiber may be used for only a portion of the cloth, such as weft or warp, or may be used at an interval of every one or two pieces of weft or warp as well. As for other fibers beside the conjugate fiber, for example, normal fiber consisting of polyester having the above higher melting point can be used.

There is no particular limitation of the sieve opening (or mesh) in the screen cloth, but it is preferable from the standpoints of ink permeability and image property that the sieve opening is in the range of 70 mesh–400 mesh and the thickness is in the range of 40 μm–200 μm.

The heat-sensitive stencil sheet of the present invention is prepared by superposing the thermoplastic resin film on the substrate and heating under pressure the superposed film and substrate at the softening point or higher of the above exposed component of the conjugate fiber and at a temperature lower than the melting point of the other component of the conjugate fiber and lower than the melting point of the thermoplastic resin.

DETAILED DESCRIPTION OF THE INVENTION

The invention will specifically be described with reference to Examples and Comparative examples in the following. In these examples, a melting point of a resin was determined by a peak observed in the endothermic curve due to the crystal portion of the resin, which was measured by a differential thermal analysis. A softening point of the resin can be also determined by a differential thermal analysis.

EXAMPLE 1

A screen cloth (sieve opening 70 mesh and thickness 110 μm) composed of polyester conjugate multifilaments having a sheath-core structure (sectional area ratio of sheath component and core component: 50/50, core component: polyethylene terephthalate homopolymer, sheath component: polyethylene terephthalate-polyethylene glycol copolymer (m.p. 200° C.)), and a polyethylene terephthalate film of 2 μm, in thickness were superposed on each other, passed through between a metal roller heated at 120° C. and a silicone rubber roller at a nip pressure of 1.8 kg/cm$^2$ so as to adhere the screen cloth and the film on each other to give a heat-sensitive stencil sheet. The surface of the fiber constituting the screen cloth was adhered uniformly to the film by thermal fusion. Dimethyl silicone oil was coated on the film surface of this sheet, which was then provided in an integrated type process printer (product of Riso Kagaku Kogyo Co., RISOGRAPH RC-115, registered trademark) to print on. Good printed images could be obtained.

EXAMPLE 2

A screen cloth (sieve opening 200 mesh and thickness 75 μm) composed of polyester conjugate monofilaments having a sheath-core structure (sectional area ratio of sheath component and core component: 60/40, core component: polyethylene terephthalate homopolymer, sheath component: polyethylene terephthalate-polyethylene glycol copolymer (m.p. 200° C.)), was superposed on a polyethylene terephthalate film of 2 μm in thickness, passed through between a metal roller heated at 120° C. and a silicone rubber roller at a nip pressure of 1.8 kg/cm$^2$ so as to adhere the screen to the film to give a heat-sensitive stencil sheet.

Dimethyl silicone oil was coated on the film surface of this sheet, which was then provided in an integrated type process printer (Riso Kagaku Kogyo Co., RISOGRAPH RC-115) to print on. Good printed image could be obtained.

EXAMPLE 3

Screen cloths (90, 70 and 60 μm in thickness) having their sieve opening of 135, 200 and 420 mesh, respectively were prepared using polyester conjugate fibers (average fiber sizes: 45 μm, 45 μm and 30 μm, respectively) having a sheath-core structure (sectional area ratio of sheath component and core component: 10/90, core component: polyethylene terephthalate homopolymer, sheath component: polyethylene terephthalate-polyethylene glycol copolymer (m.p. 200° C.)), as wefts, and normal polyester fibers (average fiber size 40 μm of monofilaments) as wraps. Each of these screen cloths and polyethylene terephthalate film of 2 μm in thickness were superposed on each other, passed through between a metal roller heated at 120° C. and a silicone rubber roller at a nip pressure of 1.8 kg/cm$^2$ so as to adhere the screen to the film, to give a heat-sensitive stencil sheet.

Dimethyl silicone oil was coated on the film surface of this sheet, which was then provided in an integrated type process printer (Riso Kagaku Kogyo Co., RISOGRAPH RC-115) to print on. Good printed images could be obtained.

EXAMPLE 4

A screen cloth (sieve opening 200 mesh and thickness 72 μm) was prepared using side-by-side type conjugate fibers (average fiber size 45 μm of monofilaments) obtained by combining a lower melting point component (the same copolymerized polyester as in Example 1) and a higher melting point component (polyethylene terephthalate homopolymer) at the ratio (by weight) of 50/50 as wefts, and normal polyester fibers (the same fiber size of monofilaments) as warps. This screen cloth and polyethylene terephthalate film of 2 μm in thickness were superposed on each other, passed through between a metal roller heated at 120° C. and a silicone rubber roller at a nip pressure of 1.8 kg/cm$^2$ so as to adhere the screen to the film to give a heat-sensitive stencil sheet. The adhesion area between the film and the substrate layer was 45%, and the surface of the fibers constituting the screen cloth was uniformly adhered to the film by thermal fusion and has a good adhesion strength.

Dimethyl silicone oil was coated on the film surface of this sheet, which was then provided in an integrated type process printer (Riso Kagaku Kogyo Co., RISOGRAPH RC-115) to print on. Good printed images could be obtained.

COMPARATIVE EXAMPLE 1

A screen cloth (a commercially available net, sieve opening 150 mesh) made of polyethylene monofilaments having a softening point of 105° C. and a polyethylene terephthalate film of 2 μm in thickness were superposed on each other and heated under pressure in the same manner as in Example 1. However, the fibers composed of the screen cloth were melted into a film form and any ink could not pass through it at all.

COMPARATIVE EXAMPLE 2

A screen cloth (a commercially available net, sieve opening 150 mesh) made of polyethylene monofilaments having a softening point of 140° C. and a polyethylene terephthalate film of 2 μm in thickness were superposed on each other and passed through between a metal roller heated at 150° C. and a silicone rubber roller in similar with the case of Example 1. However, the fibers composed of the screen were deformed. Further, since the adhesion strength between the screen and the film was extremely weak, they were peeled off from each other by slightly picking them up.

EFFECTS OF THE INVENTION

In accordance with the heat-sensitive stencil sheets of the present invention, excellent film perforating property and the resistance to printing can be obtained since a screen cloth and a thermoplastic resin film can be adhered to each other directly without forming an adhesive layer.

In accordance with the process of the present invention, the control of production processes becomes easy since there is no need of the process for forming an adhesive layer between the screen cloth and the thermoplastic resin film.

What we claimed:

1. A heat-sensitive stencil sheet consisting of a porous substrate and a thermoplastic resin film adhered to said substrate, wherein said porous substrate comprises a screen cloth wholly or partially consisting of conjugate fibers comprised of at least two components having different melting points, one exposed component of which has an affinity with and a lower melting point than said thermoplastic resin film, and wherein the screen cloth is adhered to the thermoplastic resin film through said exposed component.

2. A heat-sensitive stencil sheet according to claim 1, wherein said exposed component of the conjugate fiber is composed of a resin having a melting point lower than that of the other component resin and lower than that of the thermoplastic resin.

3. A heat-sensitive stencil sheet according to claim 1, wherein said exposed component of the conjugate fiber is composed of a resin having a melting point lower than that of the other component resin and lower than that of the thermoplastic resin film which is comprised of a higher melting point polyester.

4. A heat-sensitive stencil sheet according to claim 1, wherein said conjugate fiber is of a sheath-core or a side-by-side.

5. A heat-sensitive stencil sheet comprised of a thermoplastic resin film adhered to a porous substrate, wherein said porous substrate is comprised of a screen cloth wholly or partially consisting of conjugate fibers comprised of at least two components having different melting points, an exposed component having a lower melting point and a second component having a higher melting point, said exposed component having an affinity with the thermoplastic resin film which has a higher melting point than said exposed component, said exposed component being adhered to the thermoplastic resin film by melt adhesion.

6. A heat-sensitive stencil sheet according to claim 5, wherein said exposed component of the conjugate fiber is composed of a copolymerized polyester resin having a lower melting point, the other component of the conjugate fiber is composed of a polyester resin having a higher melting point, and the thermoplastic resin is composed of a polyester resin having a higher melting point than said exposed component.

* * * * *